United States Patent Office 3,244,505
Patented Apr. 5, 1966

3,244,505
COMPOSITIONS HAVING AVAILABLE TRACE ELEMENTS AND PROCESSES OF MAKING SAME AND PROVIDING FOR NUTRITION OF PLANTS, SHRUBS, AND TREES
Carl Adolphson and Richard W. Simmons, Bellingham, Wash., assignors to Georgia-Pacific Corporation, Portland, Oreg., a corporation of Georgia
No Drawing. Filed Sept. 12, 1963, Ser. No. 308,320
20 Claims. (Cl. 71—23)

This case is a continuation-in-part of United States Letters patent application Serial No. 701,369, filed December 9, 1957, and now abandoned.

Our invention and discovery relates to trace elements for agriculturally and horticulturally grown products. More particularly, our invention and discovery relates to the mineral nutrition of plants, especially the providing of the trace elements required by plants in a specific type of carrier material, namely sulfonated lignin-containing material. It particularly relates to the new composition and the process of making such composition as well as the application of this product to the nutrition of trees, plants and shrubs.

Our invention and discovery in one of its broader aspects involves modifying a sulfonated lignin-containing material to have sufficient iron present and to incorporate further one or more trace elements suitable to rectify any combination of soil deficiencies, such further additional trace elements being zinc, copper, molybdenum, boron and manganese. A still further and important aspect of our invention and discovery is the providing of a plant nutrient containing one or more of the six trace elements above specified in any of the combinations thereof possible, wherein the total trace element content of the modified sulfonated lignin-containing material in aggregate exceeds the stoichiometric equivalent of the sulfone sulfur content.

For decades past, the chemistry of the major elements for the nutrition of plant growth has been well known, namely nitrogen, phosphorous and potassium. However, there are minor elements such as manganese, iron, molybdenum, zinc, boron, and copper that are important to the growth and avoidance of plant diseases and the amount of yield of plants. It is becoming a commonly known fact that certain soils, due to the lack of essential mineral elements in the parent rock, due to the lack of aeration, due to inactivating soil conditions or due to improper balance among the nutrients in the native soil are unable to supply certain or many of the essential elements in proper quantities to sustain life or proper yield or vigorous growth in the plants.

The providing of copper presents difficulties and much of it is not made available in ordinary processes for use by the plants. Other important factors are of an economic character involving the manner of application of the minor elements to the plants. The minerals may be applied to the soil by mixing therewith or in the case of proper and carefully prepared compositions, the same may be applied to the foliage of the plants by spraying the compositions either in the dust or solution form. Frequently, however, spraying causes a burn or other objectionable results on the foliage and therefore only certain compositions may be thus applied. Manifestly, spraying and particularly if this may be accomplished by only a spraying of once or twice a growing season is much more economical than including the compositions with the soil.

It may be readily seen that this highly complex field involves a variety of soil conditions, various soil and sunlight conditions and the possible absence of one or more only of the minor elements. There may be several approaches to the alleviation of the symptoms of improperly nourished crop. However, in spite of the original condition, any system which will apply an adequate quantity of the missing element in proper balance with the other elements needed by the plant will provide an effective remedy. It has been found that the provision of a single element which might be lacking is not always a good method of curing the symptoms of the plants in the field. This is because it is very difficult to establish the proper balance among the elements under natural growing conditions. Further, many of the frequently used sources for these trace elements become ineffective because of the conditions in the soil which rendered the deficiency originally present.

Several types of products have been developed as remedial material for plant mineral deficiencies. These include the insoluble, root contact, fritted type of materials, the chelated materials, and the insoluble materials for application as a dust to leaves. Each of these materials has certain disadvantages inherent in the nature of the material itself. The dependence upon root contact, for example, means a slow response of the applied mineral element and the necessity of accurate placement in the soil. The use of chelated materials by way of spraying in which the chelating agent is a synthetic organic molecule of strong chelating power gives rise to toxic reactions in leaves. The application of relatively insoluble dusts to the leaves depends upon some moisture in the form of dew or plant exudate to accomplish an ionic transfer into the tissue of the plant itself. In the case of this present invention, the need for an adequate material has given rise to a conception which embodies the minor elements in adequate balance, all bound to a large natural organic molecule, resulting in a soluble material of great safety which can be as well applied to the leaves of plants as to their roots. It is a soluble material which can be mixed with ordinary mixed fertilizers, can be dissolved in aquous ammonia for application to plants, or it can be incorporated in foliar sprays of insecticides or fungicides.

The most common minor element nutritional deficiencies observed in the field are those in which the soil condition itself has occasioned the appearance of adverse plant symptoms. While the plants themselves may show symptoms of only one of these deficiencies, the analysis of the tissue indicates that frequently three, four or even five deficiencies are superimposed in one plant. The application of, say, iron to an iron chlorotic plant will frequently eliminate the symptom of iron deficiency, but immediately the symptoms of zinc deficiency may appear. Very frequently, the existence of zinc deficiency will result in a characteristic die-back of the twigs and of the growth points in a manner that is suggestive of the deficiency of either of them. In general, alkaline soils have several concomitant deficiencies. This same condition appears to be true in the case of the southern coastal plain and Florida as well. Here the occasioning cause is not alkalinity, but other factors have resulted in multiple deficiency patterns.

In many of these cases, it is manifest that the application of a single element, be it chelated, insoluble or fritted, would be ineffective in returning the plant to a normal healthy growing condition. Yet, it is equally manifest that it could be a problem of practical severity to make a specific properly balanced mixture for each particular field or piece of land in which two or more elements are deficient. Thus, a primary object of the present invention and discovery is to provide a balanced mixture or composition of the minor elements uniformly bound to lignosulfonate in which the ratios between the individual nutrients are within physiological balancing ranges under all conditions that have been met in the field and which are as effective in curing any single deficiency as it is in curing any combination deficiency among the five microelements which it contains.

A further object of our invention and discovery is to provide such a composition having said properties which is characterized by meeting economical requirements in cheapness of application and in providing desired results.

It is also the object of our invention and discovery to provide a composition which is relatively stable in the soil and one in which the mineral elements are held tenaciously enough to withstand the attrition from adverse soil reactions, but are absorbed by the root hairs.

Another objective of our invention and discovery is to provide a composition which is compatible with the commonly used insecticides and fungicides which are used to control plant infestation and disease.

Another object of our invention and discovery is to provide a composition which will not be toxic to plants and which will have a wide ratio between the effective dosage and the dose which might cause toxic effects.

SOURCE OF RAW MATERIAL

We have found that the lignosulfonates are highly effective in providing an organic chelating material for the mineral nutrients which hold these elements tenaciously enough that they are still available to the plant. Furthermore, the lignin material which is of plant origin, though somewhat altered from its original nature as a result of the sulfonation action, is still a substance tolerated and assimilated by the plant and therefore does not produce toxicological reactions. The lignosulfonates are derived from wood or other lignocellulosic materials as a result of the sulfite cooking process and are obtained from the spent sulfite liquor, or by sulfonation of the lignin product obtained from standard and well known cooking processes used in the paper and pulp industries.

Spent sulfite liquor and sulfonated lignin products obtained from lignocellulosic materials contain not only the lignin in the form of various lignosulfonates but also such carbohydrates as glucose, xylose, fructose, mannose, galactose, and other more or less volatile organic compounds. The relative proportions of these components vary with the wood species or lignocellulosic material and with the cooking conditions. While the lignosulfonate materials as obtained from the pulp process may be used, often it may be desirable to remove or separate some of the constituent prior to the reaction of lignosulfonate mixture for the formation of the additive. For example, the carbohydrates of the spent sulfite liquor are subjected to fermentation after said liquor has been subjected to stripping to remove free sulfur dioxide, hydrolyzable sulfur compounds and other volatile organic compounds.

The lignosulfonates derived from the sulfite and sulfate process occur mainly as a calcium, magnesium, sodium, or ammonium salt of the lignosulfonate. Any of these may be used for the purpose of the preparation of these nutrient materials. However, the most practical of these for the purpose are the calcium salts because on the addition of sulfates of the metal desired, calcium is precipitated as the metal lignosulfonate is formed. Salts of the lignosulfonates formed by such reaction are exemplified by the following: iron, zinc, copper, manganese, and magnesium. These are ionized to some extent and it would be anticipated that they would be readily removed from the lignosulfonate molecule. But, surprisingly, the elements once reacted and chelated or complexed with the lignin are not readily removed by precipitation. For example, the iron lignosulfonate is stable to the addition of sodium hydroxide up to the pH of 12 or higher. One would expect to obtain a precipitate of iron hydroxide but no such precipitation is formed. The salts of the lignosulfonate are thus believed to be, to some extent, chelated or complexed because they resist precipitation, say with sodium hydroxide. However, the degree of chelation is not objectionably irreversible since other chelating agents such as the salts of ethylene diamine tetra acetic acid will remove iron, zinc, copper, manganese, etc. from the lignosulfonate salts and this action can be illustrated by colorimetric methods.

In choosing the spent sulfite liquor for making the compounds of our invention, it is advantageous, among other reasons, to first remove essentially all of the sulfur dioxide sulfites, bisulfites and other hydrolyzable sulfur compounds. Sulfur dioxide has been shown to be toxic to plants in small concentration.

Our particular process, as stated above, involves first a steam stripping of the digester liquor to remove $SO_2$ and hydrolyzable sulfur compounds followed by a neutralization to a pH of 3.0 to 5.5 followed by fermentation with yeast and nutrients to produce alcohol, the removing of this alcohol by steam stripping or distillation and finally a concentration at high temperature to a solids content of about 50%. These procedures bring about a resulting product which is desirably free of sulfur dioxide, hydrolyzable sulfur compounds and volatile organic compounds which are injurious to plants. A fermentation process as disclosed in United States Letters Patent No. 2,430,355, may be used.

In the preparation of the mineral salts and chelated compounds of the lignosulfonate, one of the main difficulties is that as much as 60% to 70% or more of the copper added to form the copper salt may result as a greenish-yellow, partially colloidal precipitate of cuprous oxide. The amount of copper destroyed in this manner is dependent in a marked degree on the type of spent liquor being used. For example, if vacuum evaporated fermented liquor is used, about 30% of the copper is lost whereas if fermented liquor is concentrated at high temperature where more organic materials are decomposed and sulfur dioxide lost, the amount of copper precipitated is only about 15%. It has been found that this difficulty can be overcome by acid treatment of the liquor at elevated temperature at a pH of less than 2. Thus, 12% of sulfuric acid on the basis of the spent sulfite liquor solids is added to a 50% solution of these solids in water giving a pH of about 0.5 and the solution is heated for 15 hours at 90° C. for the purpose of this application and preventing the loss of copper. The product is treated with 15% of copper sulfate ($5H_2O$) based on the spent sulfite liquor solids, neutralized to pH 5 with NaOH and heated for several hours at 90° C. Substantially all the copper remains in solution under this treatment.

Alkaline treatment of the lignosulfonate also destroys the objectionable groups in the sulfite liquor solids which causes the insolubilization of the copper and this procedure involving a treatment with sodium hydroxide or other alkaline reagents is indeed an extremely inexpensive one and reduces the amount of copper lost to less than 8% of the copper added. A procedure as disclosed in United States Letters Patent No. 3,007,910, may be used. Briefly stated, it involves treating spent sulfite liquor with sufficient inorganic base reagent to maintain the pH within the range of 7 to 10 pH while holding the temperature within the range of 40° C. to 120° C.; and continuing said reaction until no further drop in pH occurs when the addition of said reagent is stopped. However, for the purpose of the present invention, it is not entirely necessary to adhere strictly to such procedure. It is only necessary to make the liquor alkaline and heat under alkaline conditions.

The procedure then is to treat the fermented and concentrated liquor with a basic reagent such as sodium hydroxide or magnesium oxide and maintain the pH between 7 and 10 for at least one hour at a temperature of about 90° C. after which the elements of iron, copper, manganese, and zinc can be added by ion exchange or base exchange. Thus, our procedure preferably is to add iron and manganese sulfates to the alkaline treated liquor which addition brings the pH to about 4.0. Next, copper sulfate and zinc sulfate are added (commercial grades have pH 4) and finally sodium molybdate which have a pH of about 9 to yield a final product with a pH of about 5 to 5.5. Copper tends to precipitate if the liquor is much above a pH of 4 or 5 when it is added.

It is preferable for the iron to be in the ferrous form for the nutrition of plants. Thus, if the spent sulfite liquor product contains reducing substances, some of the iron may be added as ferric iron which is then reduced to ferrous iron and the remainder of the iron can be added as ferrous iron or all of the iron could be added as ferrous iron. Whatever the state of oxidation of the iron added, it is preferable to add the iron as a salt which will bring about the precipitation of the calcium bound to the lignosulfonate. The excess of iron above that exchanged for the calcium is present in chelated or complexed form up to the complexing capacity of the particular sample of fermented spent sulfite liquor solids. The percent of cations held in this manner is dependent on the modified form of the lignin present but also on the elements involved. The molybdenum and boron which are added as sodium molybdate and sodium borate appear to be held in some type of coordination complex. The amounts of these compounds added to the fermented spent sulfite liquor solids in relation to the amounts of the other trace elements added are so small that the addition does not appear to influence the chelating capacity of the lignosulfonates for the other trace elements. However, these are held in this material readily available to the plant and are unusually resistant to alkaline soils which promote deficiencies of molybdenum and boron in plants.

CHOOSING PROPORTIONS OF MINERAL NUTRIENTS

In choosing a proper ratio between the mineral nutrients which are to be added to the treated spent sulfite liquor solids, balance among these elements as well as between these and the other plant nutrients is involved. For example, an ideal plant ratio between iron and manganese has been found to be in the order of 10 parts of iron to 4 parts of manganese. In the alkaline soils for which our exemplary mixture is particularly designed, a ratio which slightly favors the iron, namely 10:3 has been chosen. For the eastern coastal plants, a ratio nearer to 10:8 would be preferred; while for Hawaii, a ratio nearer 10:2 would be appropriate.

Similarly, there is an ideal ratio between copper and iron. Since the three elements, iron, copper, and manganese are interchangeably in equilibrium with the protein portion of respiratory enzymes, and since each combination has a different function in the plant cell, it is of critical importance to the welfare of the plant that physiological balanced ratio be maintained. As with the manganese, a nearly ideal ratio of 10:1 iron to copper has been chosen for the exemplary mixture. However, variations from twice or 10:2 to half or 20:1 would lie safely within physiological normals.

With zinc, one must consider the character of the soil more carefully. Since our exemplary mixture is intended primarily for the western part of the United States, a rather high level of zinc is chosen, roughly 10:3, iron to zinc. In some cases, a ratio as high as 10:6 might be indicated. Yet for more acid soils, 10:2 would be nearly correct.

When considering molybdenum and boron, one must always remember the toxicity of these materials. A level has been found from which little or no deviation should be contemplated.

To summarize, the following table is presented. It is intended to exhibit the permissible ranges of ratios between iron and the other nutrients, but there is no suggestion implied that the maximum or minimum ratios of all the elements would necessarily be combined in a single mix. Thus, a particular mix could contain a normal ratio of three of the elements along with a minimum level of one and a maximum level of the fifth. See Table I.

Table I

RATIOS OF THE ELEMENTS
(by weight)

| Element | Maximum | Average | Minimum |
|---|---|---|---|
| Iron | 100 | 100 | 100 |
| Manganese | 80 | 30 | 20 |
| Copper | 20 | 10 | 5 |
| Zinc | 60 | 32.5 | 20 |
| Boron | 30 | 20 | 10 |
| Molybdenum | 4 | 2 | 1 |

The multi-element products may be tilled into the soil, or dissolved in water or aqueous ammonia and added to the soil or sprayed on the foliage. For direct addition to the soil, it is convenient to mix the dried product with the fertilizer. In commonly employed fertilizers, our composition may be mixed at about 10 to 20 pounds per ton of fertilizer. For spraying foliage, the aqueous solution should contain not more than 5% total solids and preferably about 1.0% total solids or less. Spraying with higher than 5% may cause toxic effects.

ON FIELD DATA

Several extensive applications of this multi-element combination were made to crops. The material was applied in mixture with dry fertilizers, in solution in aqua ammonia, as a spray from ground equipment, and as a spray from airplanes. Some of the definitive results are presented below in tabular form. The data in Table II indicate the effectivness of this combination material as a remedial material in cases of aggravated nutritional deficiency. In Table III are shown the economic gains due to the application of this invention to crops where the harvested yields of the treated and untreated portions of the fields could be separately measured.

The analysis of the dried product was approximately as follows:

Component:                      Percent of bone dry solids
    Iron (as Fe) _____ 4.0
    Manganese (as Mn) _____ 1.4
    Copper (as Cu) _____ 0.6
    Zinc (as Zn) _____ 1.3
    Boron (as B) _____ 0.8
    Molybdenum (as Mo) _____ 0.1

It was prepared by heating fermented spent sulfite liquor having a concentration of about 50 weight percent solids for about 20 hours at 80° C. to 100° C. while maintaining the pH at 8 by adding sodium hydroxide. This heating destroys sugars and other reducing compounds which had not been previously removed by fermentation and thus would otherwise cause precipitation of copper. To 200 parts by weight of the alkaline treated solution, 9.5 parts of ferric sulfate was added to the liquor at about 80° C. Prior to addition of the ferric sulfate, the ferric sulfate was dissolved in water.

After the addition of the iron solution, the other metal salts were dissolved in water and added in the following order: Manganous sulfate was added next to the amount of 2.5 parts by weight of manganous sulfate

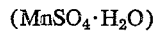

($MnSO_4 \cdot H_2O$)

followed by 1.2 parts by weight of copper sulfate hydrate containing $5H_2O$ ($CuSO_4 \cdot 5H_2O$) followed by 2.4 parts of commercial zinc sulfate containing about 89% zinc sulfate, 3.9 parts of sodium tetraborate containing 92 weight percent of $Na_2B_4O_7 \cdot 5H_2O$, and 0.13 part of sodium molybdate hydrate ($Na_2MoO_4 \cdot 2H_2O$).

After the addition of the above metals was completed, the mixture was heated to about 90° C. and then centrifuged to remove calcium sulfate and other insolubles. The product was then dried.

Table II

RESPONSE OF DIFFERENT CROPS TO TREATMENT WITH MULTI-ELEMENT COMPLEX

| Crop | Deficiency (from tissue analysis) | Condition prior to treatment | Treatment, lbs./acre | Condition following treatment |
|---|---|---|---|---|
| Stone fruit orchard | Zn, B, Mn | No growth on newly-set trees by mid summer. Frenching [1] of leaves. Terminal bud dying. | 5 | Surge of new growth. Leaves greened. (2 weeks). |
| Maple seedlings (nursery) | Iron, zinc, boron | Extreme chlorosis, "little leaf," terminal die-back. | 5 | Initiation of growth, normal leaf size and color (2 weeks). |
| Pear seedlings (nursery) | Iron, copper, boron | White tops (terminal chlorosis) poor growth. | 5 | Normal color, excellent growth response (2 weeks). |
| Peach seedlings (nursery) | Copper, boron | Terminal die-back, water-sprouting, shoot die-back. | 7 | Resumption of leader's growth. Normal branching (1 week). |
| Alfalfa | Molybdenum, B | Stunted, yellow, field | 5 | Green, normal growth (2 weeks). |
| Apple trees | Zn, B, Mn, Fe | No spring growth. Frenching of leaves. Terminal die-back. Small leaves. | 10 | Sudden growth of many dormant shoots. Normal leaf size and color (5 days). |
| Pear trees | Zn, B, Mn | "Pear Decline" | 5 | New growth and greening (1 week). |

[1] Frenching—yellow stripping.

Table III

EFFECT OF SPRAYING WITH MULTI-ELEMENT COMPLEX ON YIELD OF SEVERAL CROPS

| Crop | Test acreage | Treatment, lbs./acre | Yield, lbs./acre | |
|---|---|---|---|---|
| | | | Untreated | Treated |
| Beans, dried kidney | 30 | 5 | 2,800 | 3,600 |
| Peppermint oil | 30 | 7 | 64 | 87 |
| Grapes | 4 | 6 | 14,000 | 20,600 |

A given stripped and fermented sulfite liquor will have a definite capacity for chelating trace elements which will vary somewhat with the particular trace element or trace elements involved. It is believed that capacity is associated with the valence of the trace elements, i.e., there will be a definite maximum concentration at which a given sulfite liquor can stabilize the trace element containing reaction product to the action of agents such as sodium hydroxide which tend to precipitate some of the trace elements as hydroxides. Some indication of the level of stable concentration of those trace elements present in cationic form is obtained by adding sodium hydroxide to a solution of the trace element containing reaction product and noting whether or not a precipitate is formed, as evidenced by cloudiness of the solution.

To carry out a test of this nature, 1.25 grams of the dried iron containing trace element reaction product was dissolved in 50 milliliters of water and examined as follows. Sodium hydroxide solution was added to two portions to give pH values of 8 and 10. To two further portions, 0.6 gram of ferrous sulfate (Fe, SO$_4$, 7H$_2$O) was added and dissolved and the solution adjusted to pH 8 and 10 with sodium hydroxide. Likewise, additional portions of the original solution were treated with 1.2 grams and 2.0 grams of ferrous sulfate and adjusted to pH 8 and 10, all of which is clearly set forth in Table IV below.

All of these solutions were allowed to stand for about one hour and examined to determine whether any turbidity and precipitation occurred. The results of these experiments are recorded in the following table.

Table IV

| Weight of FeSO$_4$·7H$_2$O | Percent Fe | Stability pH$_8$ | Stability pH$_{10}$ |
|---|---|---|---|
| 0 | 9.5 | Clear | Clear. |
| 0.6 | 12.9 | do | Do. |
| 1.2 | 14.4 | Very slightly cloudy. | Very slightly cloudy. |
| 2.0 | 16.0 | Precipitate | Precipitate. |

The first column gives the weight of ferrous sulfate (7H$_2$O) added to the solution. The second column gives the percent of iron (based on the weight of total solids in the solution taken as the weight of spent sulfite solids originally present plus the ferrous sulfate 7H$_2$O added). As can be seen in the table, the iron containing reaction product prepared according to our method, easily stabilized at about 14.4% of iron. The addition of more than the equivalent of 14.4% of iron to this particular liquor would therefore be objectionable because it would occur as a precipitate in the product and would therefore be useless (i.e., in a form unavailable for nutrient purposes), particularly when the product is to be used for spraying.

A similar experiment shows the effect of adding increasing percentages of manganese as manganese sulfate (MnSO$_4$1H$_2$O). The manganese sulfate in this case was added to the solution of the iron containing reaction product of the immediately preceding example, i.e., the solution containing 1.25 grams of iron containing reaction product in 50 milliliters of water. The tests were carried out in the same manner as described for the iron compound above and the percent of manganese and iron shown in Table V are shown as percentages of the total solids in the solution after the addition of manganese sulfate.

The data assembled in Table V show that this fermented sulfite liquor prepared by our process can stabilize (i.e., chelate) at least 10.5% manganese sulfate plus 6.4% iron. Above this concentration, there is a tendency of additional manganese to precipitate which is objectionable because it probably would not be available to the plant in such insoluble form. Manifestly, from the above, it is clear that our composition is characterized by the property of stabilizing solutions of one or more of the trace elements Cu, Fe and Mn to the precipitating action of hydroxyl ions so that our composition remains stable in alkaline soil and available to the plant.

Table V

| Wt. of MnSO$_4$1H$_2$O | Percent Mn | Percent Fe | Stability pH$_8$ | Stability pH$_{10}$ |
|---|---|---|---|---|
| 0 | 0 | 9.5 | Clear | Clear. |
| 0.4 | 7.9 | 7.2 | do | Very slightly cloudy. |
| 0.6 | 10.5 | 6.4 | Clear | Cloudy. |
| 0.8 | 12.7 | 5.8 | Precipitate | Precipitate. |
| 1.2 | 15.9 | 4.8 | do | Do. |

The addition of small concentrations of sodium borate and sodium molybdate to the clear solutions obtained in the above experiments did not produce any indication of precipitation. This is occasioned by the fact that the boron and molybdenum are not present in cationic form.

In summary, as to chelating capacity and stability of our trace element containing reaction products, the foregoing data indicate the following general propositions and considerations. As to the elements Fe, Zn, Cu, and/or Mn, the collective or total effective trace element concentration capability or capacity is determined by the relative proportions and valences of the particular elements present, with the amount or amounts (considered weight-wise) necessary to give chelation saturation as a result varies to a limited degree and can be easily determined. These same considerations are also true of the amount or amounts (again considered weight-wise) of trace elements necessary to establish an excess over the stoichiometric equivalent of the contained sulfone sulfur in any given complex.

Thus, for example and as shown by the data of Tables IV and V when only iron is present, the amount of iron which produces chelation saturation is reached at about 15% iron content of the reaction product solids by weight. Correspondingly, when manganese is present with iron, the chelation saturation capability of the liquor tested permitted a total trace element content of about 17% by weight.

To illustrate the effect of having the metal content in excess of the stoichiometric equivalent of the sulfone sulfur content, runs were made using various amounts of iron interacted with lignosulfonates to show the effect obtained upon plant growth.

The metal supplements used were prepared by using fermented calcium base spent sulfite liquir. To 218 gram samples of the concentrated liquir containing about 48% solids, sodium hydroxide was added to neutralize the samples to a pH of 8. Each sample was maintained at a pH of 8 for one hour and heated to 80° C. The samples were then diluted to about 1000 milliliters and a predetermined amount of ferrous sulfate solution was added to each sample to interact various amounts of iron with the lignosulfonate in the spent sulfite liquor. After the addition of the ferrous sulfate solutions, the mixtures were adjusted to a pH 7 by addition of sodium hydroxide. The mixtures were maintained at a pH of 7 for two days by addition of dilute sodium hydroxide and then diluted to give 640 milligrams of iron per liter. In this manner, supplements containing 3, 6.5, 7.4, 10.4, 12.5, 20 and 30 weight percent of iron, based upon the spent sulfite liquor solids, were prepared.

Equal sized flats equivalent to about 1/333,000 of an acre were prepared. The flats were filled to a depth of six inches with washed builder's sand to which was added a solution containing the following constituents:

| | Grams |
|---|---|
| $Ca(NO_3)_2 \cdot 4H_2O$ | 57 |
| $K_2HPO_4$ | 23 |
| $MgSO_4 \cdot 7H_2O$ | 90 |
| KCl | 10 |
| Urea | 70 |

The above amounts provided nutrients on the basis of an acre as follows:

| | Lbs./acre |
|---|---|
| N | 800 |
| $P_2O_5$ | 200 |
| $K_2O$ | 400 |
| MgO | 333 |
| CaO | 520 |
| S | 250 |

The supplements were added to the flats in amounts to give 20 pounds per acre of iron. Five flats for each supplement were prepared and then the flats containing the particular supplements were intermixed at random. Ryegrass was then sewn on the flats and the surface of the flats covered with crumbled styrofoam.

After the grass came up, it was clipped to maintain a uniform height on the 13th, 26th, and 33rd day after planting. The clippings thus obtained were weighed. The weight of the clippings obtained are shown in the table below:

| Supplement | Weight percent iron based upon SSL liquor solids | Weight of clippings, grams | | | |
|---|---|---|---|---|---|
| | | 13th day | 26th day | 33rd day | Total |
| 1 | 3 | 1.1 | 3.4 | 3.4 | 7.9 |
| 2 | 6.5 | 2.8 | 3.5 | 5.6 | 11.9 |
| 3 | 7.4 | 7.2 | 9.3 | 8.5 | 25.0 |
| 4 | 10.4 | 7.1 | 8.8 | 9.0 | 24.9 |
| 5 | 12.5 | 7.2 | 9.5 | 8.4 | 25.1 |
| 6 | 20 | 6.3 | 5.6 | 7.7 | 19.6 |
| 7 | 30 | 6.0 | 4.0 | 4.7 | 14.7 |

A further test was made to show what effect pretreatment of the spent sulfite liquor prior to preparation of the soil as well as the various amounts of metal have upon the response obtained on azalea tissue. An iron salt was also used for this run. The procedure for the preparation of the iron lignosulfonate was similar to that described above except that the pretreatment of the lignosulfonate prior to reaction with the iron sulfate was modified as described below:

In carrying out these experiments, the Warburg method of measuring tissue response was utilized. This comprised comparing the respiration of the azalea tissue during the hour after the addition of an iron supplement nutrient composition, with its oxygen consumption during the hour prior to such addition. In all tests, 300 micrograms of iron were added to approximately 100 milligrams of freshly minced azalea bud tissue suspended in 1.5 milliliters of a buffered glucose solution at a pH of 6.5, all results being reported as the percentage increase in oxygen consumption following addition of the iron material. Two or more tests were made at each concentration of iron and the average of the results set forth was taken.

In the first run, products were made from raw spent sulfite liquor without any pretreatment. The spent sulfite liquor was collected at the blow-pit prior to stripping or use of other means for removal of $SO_2$. These products contained from 2.8% Fe to 9.1% Fe on total solids. The results of tissue response tests are as follows:

| Percent Fe: | Average percent response |
|---|---|
| 2.8 | −17 |
| 4.8 | 0 |
| 6.2 | 8 |
| 7.7 | 3 |
| 9.1 | −1 |

A second run was made where lime treated spent sulfite liquor was used. A portion of the raw liquor used above was treated with a suspension of calcium hydroxide until a stable pH of slightly over 8 was obtained. At this pH, the liquor was heated for 24 hours at 85° C. to 90° C. The clear supernatant liquor was decanted off and used to prepare the iron compounds. The results of the tissue response to these compounds are shown below.

| Percent Fe: | Average percent response |
|---|---|
| 5.0 | −4 |
| 7.7 | 48 |
| 10.2 | 40 |

In the third run, the composition of the metal supplement compounds were prepared from stripped and fermented liquor which had been alkaline treated prior to reaction with the iron sulfate. The compounds ranged from 2.94% to 40% Fe. The results obtained are indicated below.

| Percent Fe: | Average percent response |
|---|---|
| 2.94 | 55 |
| 5.03 | 54 |
| 5.65 | 51 |
| 5.91 | 56 |
| 6.54 | 52 |
| 7.40 | 145 |
| 10.7 | 113 |
| 12.5 | 126 |
| 20.0 | 67 |
| 30.0 | 52 |
| 40.0 | 41 |

The terms "chelated iron" and "metal present in chelated form" refer to the metal in solution either in combined or other form, over and above the quantity of the metal chemically (i.e., stoichiometrically) equivalent to the sulfone sulfur content of the sulfonated lignin-containing material. For example, if the sulfone sulfur content of the material solids was about 5%, then it required about 4.3% ferrous iron for chemically combined equivalency to the sulfone sulfur and any iron in addition would then be present in a chelated form. Thus, broadly according to the present invention, there is present substantially more than 5% ferrous iron, for example, from 7% to 15% of ferrous iron, a specific preferred example being 9.5% ferrous iron, when the percentage is based upon the spent sulfite liquor solids. Since the lignosulfonate materials generally obtained contain many constituents, the expression of the metal content on the basis of solids content of lignosulfonate material as ordinarily done in the trade is the most convenient. The iron should be in the ferrous form, and, in general, ferrous salts should be used in the preparation. However, a small proportion of ferric salts can be used because the reducing character of the sulfonated lignins generally tends to reduce any ferric iron to ferrous iron.

Correspondingly, and considering the invention in terms of total trace element cation present, whether or not iron is one such trace element, the aggregate or total trace element content advantageously exceeds the stoichiometric equivalent of the sulfone sulfur content. It will, of course, be readily understood that some of the trace elements contemplated, notably molybdenum, do not or need any actually chemically combine with the sulfone sulfur.

What is claimed is:

1. The process of improving the growth of plants comprising applying to the plant a solution prepared by the process of forming a water-soluble trace element nutrient composition from sulfonated lignin-containing material, comprising the steps of removing susbtantially all of the available sulfur dioxide and hydrolyzable sulfur compounds by steam stripping an aqueous solution of sulfonated lignin-containing material, removing substantially all of the fermentable carbohydrates from said solution by fermentation, heating said solution of sulfonated lignin-containing material under alkaline conditions, and admixing said solution with at least one water-soluble metal compound wherein said metal is selected from the group consisting of iron, zinc, manganese, copper and mixtures of these metals, said metal compound dissolving in water to form ions containing said metal.

2. The process of claim 1 wherein said sulfonated lignin-containing material is obtained from spent sulfite liquor and wherein said metal compound is a sulfate salt.

3. The process of claim 1 wherein the alkaline heating step is carried out with a sufficient amount of basic reagent to establish and maintain the hydrogen ion concentration of the solution within the range of about 7 to about 10, and wherein the temperature is maintained within the range from about 40° C. to about 120° C., the alkaline heating step being continued until substantially no further drop in hydrogen ion concentration occurs.

4. The process of claim 1 wherein said metal compound is a copper salt.

5. The process of claim 1 wherein said solution is admixed with a water-soluble iron compound and at least one water-soluble metal compound wherein said metal is selected from the group consisting of zinc, copper, manganese, boron, and molybdenum and mixtures of these metals, said compounds dissolving in water to form ions containing said metals, the relative weights of the iron compound and the compound of each of the selected metals being in balanced relation such that the ratio of iron to each selected metal is in about the following ranges of proportions:

| Metal | Maximum proportion | Minimum proportion |
|---|---|---|
| Fe | 100 | 100 |
| Mn | 80 | 20 |
| Cu | 20 | 5 |
| Zn | 60 | 20 |
| B | 30 | 10 |
| Mo | 4 | 1 |

6. The process of claim 5 wherein the sulfonated lignin-containing material is obtained from spent sulfite liquor, and wherein the solution obtained as the product of said process is neutralized to a pH of about 5 to 5.5, the insoluble products of the process are recovered and the solids are reduced to dryness.

7. The process of claim 6 wherein the resulting weights if the iron and the metal are related in about the following proportions:

| Element: | Proportion |
|---|---|
| Fe | 100 |
| Mn | 30 |
| B | 20 |
| Cu | 10 |
| Mo | 2 |
| Zn | 30 |

8. A composition for treating plants deficient in nutrient metals, comprising a sulfonated lignin-containing material substantially free from sulfur dioxide and hydrolyzable sulfur compounds interacted with a water-soluble iron compound and at least one water-soluble metal compound wherein said metal is selected from the group consisting of zinc, copper, manganese, boron, and molybdenum, said compounds upon dissolving in water forming ions containing said metals and the total amount of said iron, and any of said compounds being such that zinc, copper, and manganese are in excess of the stoichiometric equivalent of the sulfone sulfur present in the sulfonated lignin-containing material, and the relative weights of the iron compound and each selected metal compound being in balanced relation such that the ratio of iron to each selected metal is in about the following ranges of proportions:

| Metal | Maximum proportion | Minimum proportion |
|---|---|---|
| Fe | 100 | 100 |
| Zn | 60 | 20 |
| Cu | 20 | 5 |
| Mn | 80 | 20 |
| B | 30 | 10 |
| Mo | 4 | 1 |

9. The composition of claim 8 wherein said sulfonated lignin-containing material is obtained from spent sulfite liquor and wherein said composition comprises an aqueout solution of said material and said metal compounds.

10. A process for treating plants deficient in nutrient metals which comprises applying to the plant the composition of claim 8.

11. A composition for treating plants deficient in nutrient metals, comprising a sulfonated lignin-containing material interacted with a water-soluble iron compound and at least one water-soluble metal compound wherein said metal is selected from the group consisting of zinc, copper, manganese, boron and molybdenum, said compounds upon dissolving in water forming ions containing said metals and the relative weights of the iron compound and each selected metal compound being such that the ratio of iron to each selected metal is in balanced relation in about the following ranges of proportions:

| Metal | Maximum proportion | Minimum proportion |
|---|---|---|
| Fe | 100 | 100 |
| Zn | 60 | 20 |
| Cu | 20 | 5 |
| Mn | 80 | 20 |
| B | 30 | 10 |
| Mo | 4 | 1 |

12. The composition of claim 11 wherein said sulfonated lignin-containing material is obtained from spent sulfite liquor and wherein said composition comprises an aqueous solution of said material and said metal compounds.

13. A process for treating plants deficient in nutrient metals which comprises applying to the plant the composition of claim 11.

14. A process for treating plants deficient in iron, comprising applying to the plant a water-soluble sulfonated lignin-containing material substantially free from sulfur dioxide and hydrolyzable sulfur compounds, containing from 7 to 15 percent by weight of iron, based on the weight of said sulfonated lignin-containing material.

15. The process of claim 14 wherein the sulfonated lignin-containing material is a lignosulfonate and wherein the iron and the lignosulfonate are combined in complex salt form.

16. A process for treating plants deficient in iron, comprising applying to the plant spent sulfite liquor solids substantially free from sulfur dioxide and hydrolyzable sulfur compounds and containing from 7 to 15 percent by weight of iron, based on the weight of said spent sulfite liquor solids, said iron-containing spent liquor solids being water-soluble.

17. A process according to claim 16 wherein the iron is present in an amount of 9.5 weight percent, based upon the weight of the sulfonated lignin-containing solids in said solution.

18. The process of claim 16 wherein an aqueous solution containing said solids and said iron is applied to the plant and wherein said iron is present in an amount sufficient to provide from 7 to 15 percent of ferrous iron based on the weight of said solids.

19. The process of improving the growth of plants comprising applying to the plant a solution prepared by the process of forming a water-soluble trace element nutrient composition from a spent sulfite liquor comprising the steps of removing substantially all of the available sulfur dioxide and hydrolyzable sulfur compounds by steam stripping of the spent sulfite liquor, removing substantially all of the fermentable carbohydrates from said spent sulfite liquor by fermentation, heating said spent sulfite liquor under alkaline conditions, and admixing said solution with a water-soluble iron compound in an amount of from 7 to 15 percent by weight of iron, based upon the spent sulfite liquor solids.

20. The process of claim 19 wherein the fermented spent sulfite liquor is, prior to addition of the iron compound, heated with a sufficient amount of basic reagent to establish and maintain the hydrogen ion concentration of the solution within the range of about 7 to about 10, at a temperature in the range of from about 40° C. to about 120° C., until substantially no further drop in hydrogen ion concentration is obtained.

References Cited by the Examiner
UNITED STATES PATENTS

| | | | |
|---|---|---|---|
| 1,933,445 | 10/1933 | Murdock | 71—25 |
| 1,976,905 | 10/1934 | Thordarson | 71—25 |
| 2,117,087 | 5/1938 | Formhals | 71—25 |
| 2,663,628 | 12/1953 | Thomsen | 71—25 |
| 2,846,431 | 8/1958 | Goss | 260—124.3 |
| 2,849,314 | 8/1958 | Goss | 260—124.3 |
| 2,929,700 | 3/1960 | Bennett | 71—25 |

DONALL H. SYLVESTER, *Primary Examiner.*

ANTHONY SCIAMANNA, *Examiner.*